G. G. F. BOSWELL.
SHOCK ABSORBER.
APPLICATION FILED JULY 15, 1919.

1,360,083.

Patented Nov. 23, 1920.
2 SHEETS—SHEET 1.

INVENTOR.
GEORGE G.F. BOSWELL
BY
Lockwood Lockwood
ATTORNEYS.

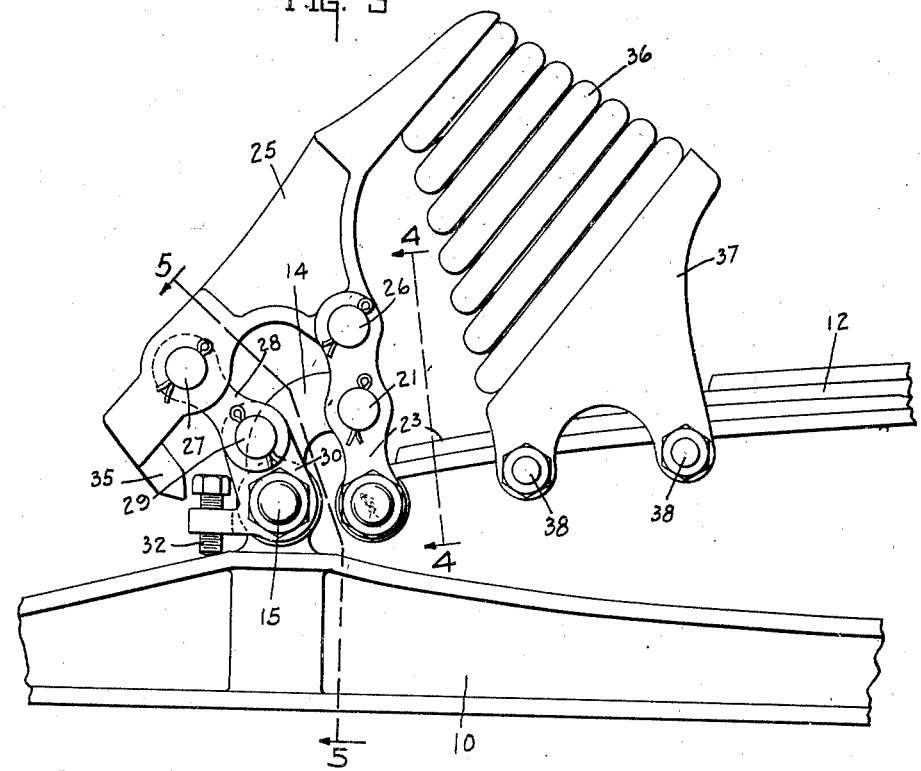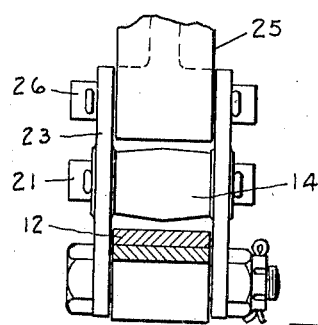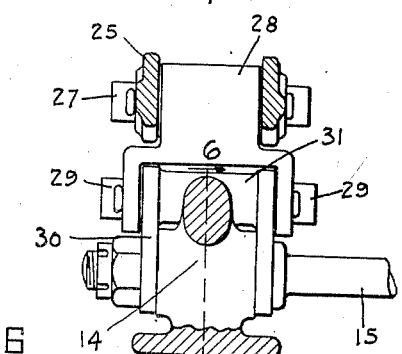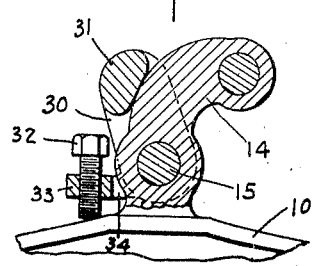

UNITED STATES PATENT OFFICE.

GEORGE G. F. BOSWELL, OF INDIANAPOLIS, INDIANA.

SHOCK-ABSORBER.

1,360,083.  Specification of Letters Patent.  Patented Nov. 23, 1920.

Application filed July 15, 1919. Serial No. 310,972.

*To all whom it may concern:*

Be it known that I, GEORGE G. F. BOSWELL, a citizen of the United States, and a resident of Indianapolis, county of Marion, and State of Indiana, have invented a certain new and useful Shock-Absorber; and I do hereby declare that the following is a full, clear, and exact description thereof, reference being had to the accompanying drawings, in which like numerals refer to like parts.

The object of this invention is to facilitate the mounting of shock absorbers on Ford automobiles and the like. In the new type of Ford automobiles, the perches for supporting the main springs of the vehicle are integral with the axle or associated part and extend upward and curve inward away from the wheels toward the center of the vehicle. It is difficult to mount some forms of shock absorbers on the perches when curved inwardly, and the purpose of this invention is for a convenient, successful and permanent mounting of shock absorbers on said perches without changing the perches.

One feature of the invention consists in substituting for the shackles found on Ford automobiles, shackles substantially twice as long and fulcrumed between their ends to the upper end of the perch and pivoted at their lower ends to the main spring and at their upper ends to the lever of the shock absorber between its ends, and pivotally connecting the outer end of the shock absorber lever by a shackle to an adjustable but fixed support mounted on the radius rod found on Ford automobiles extending through the lower part of the perch. The other end of the shock absorber is controlled by an auxiliary spring located between it and the main spring.

Figure 1:
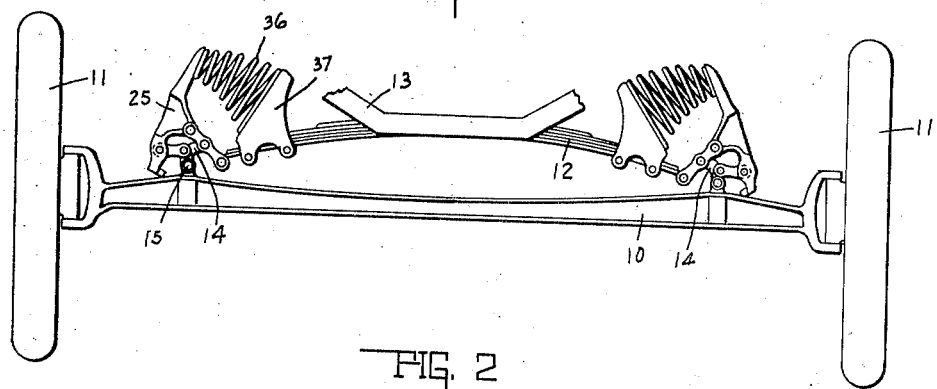
Figure 2:
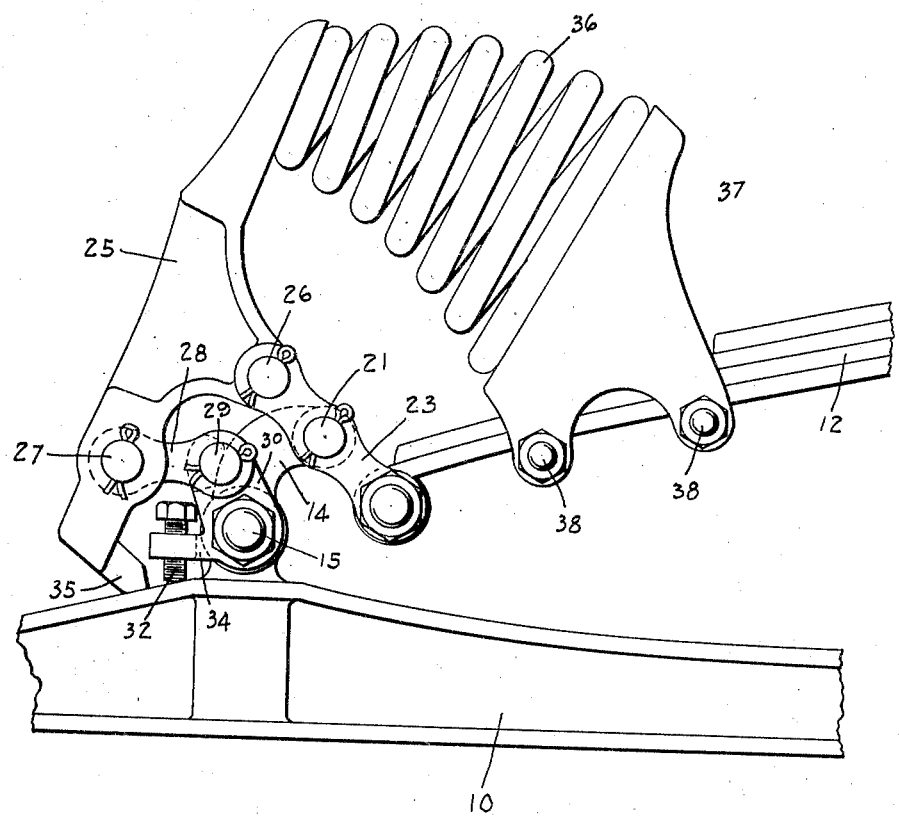

The full nature of this invention will be understood from the accompanying drawings and the following description and claims:

In the drawings Figure 1 is a front elevation of a portion of a Ford automobile equipped with the shock absorbers. Fig. 2 is a portion of Fig. 1 shown on a larger scale and with the vehicle unloaded. Fig. 3 is the same with the parts in altered position under the influence of a load. Fig. 4 is a section on the line 4—4 of Fig. 3. Fig. 5 is a section on the line 5—5 of Fig. 3. Fig. 6 is a section on the line 6—6 of Fig. 5.

There are shown herein the front axle 10 of a Ford automobile, wheels 11, main spring 12, body 13 and perches 14. The perches extend upward from the axle, and are curved inwardly away from the wheels toward the middle of the automobile. A radius rod 15 extends through the lower part of each perch 14.

The foregoing is the construction of a Ford automobile, and the shock absorbers are afterward added by the purchaser of the automobile, and the convenience of mounting the shock absorbers is as important as their service after being mounted. In the new form of Ford automobile the perches are made integral with the axle, which renders more difficult the mounting of shock absorbers.

The shock absorber shown herein consists of the following construction and is mounted in the following manner:

The main spring 12 in the Ford automobile as made and purchased is supported by simple shackles, which are pivoted at their lower ends to the end of the main spring and at their upper ends to the upper end of the perch 14 by means of the pivot 21. These shackles are removed and the new shackles 23, about twice as long, are substituted for the old shackles, and do not differ from the old shackles excepting in their greater length and being fulcrumed or pivoted on the pin 21 intermediate their ends and about midway their length.

The shock absorber has a lever 25 that is pivoted to the upper ends of the shackles 23, at a point between its ends, by the pin 26. The outer end of the lever 25 is pivoted by pins 27 to a bifurcated shackle 28, the two arms of which are pivoted on pin 29 extending laterally from a frame 30 which is rigidly but adjustably mounted. As seen in Fig. 5, the frame 30 has an upper cross bar portion 31 which extends crosswise at the outside of the perch 14, and the frame 30 has two arms extending downwardly from the portion 31 on each side of the perch and they are mounted rigidly on the radius rod 15. The two arms of the frame 30 have holes in them, and the radius rod of the automobile is removed from the perch, the frame 30 put in place and then the radius rod reinserted through the frame and perch, as seen in Fig. 4, and its position is adjusted by a set screw 32 which extends through an arm 34 on outward projections 33 from the lower ends of the two arms of the frame 30. The cross bar 31 at the top of frame 30 limits the adjustment of said frame inwardly, as seen in Fig. 6, but it can be adjusted so that the upper part of frame 31 would be farther away from the perch so as to properly mount the lever 25 to cause it to operate satisfactorily.

The lever 25 has at its outer end a stop 35 to engage the axle 10 and limit the rebound. At the inner end of the lever 25 there is a conical auxiliary spring 36 with its pins secured on the side of block 37 that is clamped to the main spring by the bolts 38, as heretofore in shock absorbers of this type.

This matter of mounting said shock absorber on an inturned perch gives ample room for the lateral and other movements of the main spring under load, as seen in Fig. 3, and it brings about the desired coöperation of the main spring and the lever 25 and auxiliary spring 36 of the shock absorber. The device has the further advantage of the adjustment of the lever 25 of shock absorber over the mounting of said lever in said type of shock absorber heretofore.

The lateral movement of the end of the main spring forces and causes outward movement of the lower end of shackles 23, as seen in Fig. 3, and the corresponding inward movement of the upper ends of said shackles 23 and the entire lever 25 of the shock absorber, a feature of operation which has not been possible in the previous mountings of this type of shock absorber. Also since the lever 25 is pivotally mounted on two shackles, of substantially the same length and pivoted at different points to stationary means, the lever not only moves down as the load goes on to the main spring, but it has a peculiar movement as its two points of connection move in different arcs, which causes the inner end of the lever 25 to move inward longitudinal as well as downward toward the block 37. This causes a better coöperation between the lever 25 and the auxiliary spring 36 than in the manner of mounting said shock absorber heretofore.

Shackles 28, as shown, is substantially horizontal and the shackle 23 is shown substantially 45 degrees from the horizontal position, while in Fig. 3, where the device is under load, the shackle 28 is moved almost to the 45 degree position and the shackle 23 to almost a vertical position, and they have thus moved the lever 25 to the right hand bodily as well as tilted it inward to a different inclination.

The invention claimed is:

1. The combination with the axle of an automobile, the main spring, and a support extending upward from the axle, of a yielding shock absorbing member, and two shackles pivotally mounted at two points on said shock absorbing member and at two points on said support, the main spring being carried by the inner one of said two shackles.

2. The combination with the axle of an automobile, the main spring, a support extending up from the axle, a shock absorber lever, and an auxiliary spring between the lever and main spring, of two shackles pivoted to the shock absorber lever at two points, and to said support at two different points, the main spring being carried by the inner one of said two shackles.

3. The combination with the axle of an automobile, the main spring, and a support extending upward from said axle, of shackles pivoted between their ends to the upper end of said support and at their lower ends to the end of the main spring, a shock absorbing lever pivoted between its ends to the upper ends of said shackles, an auxiliary spring between the inner end of said lever and the main spring, and a shackle pivoted to the outer end of said lever and to said support at a different point from the pivot of the first mentioned shackles.

4. The combination with the axle of an automobile, the main spring, and a perch extending upward upon the axle and curved inward, of shackles pivoted between their ends to the upper end of said perch and at their lower ends pivotally supporting the end of the main spring, and a shock absorber lever pivoted between its ends to the upper ends of said shackles, an auxiliary spring between the inner end of said lever and the main spring, a shackle pivoted to the outer end of said lever, and means fixed in a rigid relation to the perch to which the other end of said shackle is pivoted.

5. The combination of an axle of an automobile, the main spring, a perch extending upward from the axle, a radius rod extending through the lower end of the perch, shackles pivoted between their ends to the upper end of the perch and at their lower ends to the main spring, a shock absorber lever pivoted between its ends to the upper ends of said shackles, an auxiliary spring between the inner end of said lever and the main spring, a shackle pivoted to the outer end of said lever, and means rigidly but adjustably mounted on the radius rod to which the other end of said shackle is pivoted, substantially as set forth.

In witness whereof, I have hereunto affixed my signature.

GEORGE G. F. BOSWELL.